United States Patent [19]

Usami et al.

[11] Patent Number: 4,982,438
[45] Date of Patent: Jan. 1, 1991

[54] APPARATUS AND METHOD FOR RECOGNIZING THREE-DIMENSIONAL SHAPE OF OBJECT

[75] Inventors: Yoshiaki Usami; Kenichi Anjyo; Misato Nio, all of Hitachi; Nobuhiro Hamada, Hitachiota; Masao Yanaka, Hitachi, all of Japan

[73] Assignee: Hitachi, Ltd., Tokyo, Japan

[21] Appl. No.: 403,858

[22] Filed: Sep. 1, 1989

Related U.S. Application Data

[63] Continuation of Ser. No. 56,655, Jun. 2, 1987, abandoned.

[51] Int. Cl.$^5$ .............................................. G06K 9/46
[52] U.S. Cl. ..................................... 382/25; 382/22; 250/558; 356/2; 364/518
[58] Field of Search ...................... 382/1, 8, 22, 23, 25, 382/28, 48, 49, 57; 356/2, 3, 8, 11, 12; 250/558; 901/47; 364/516, 518, 522

[56] References Cited

U.S. PATENT DOCUMENTS

| | | | |
|---|---|---|---|
| 4,175,862 | 11/1979 | Di Matteo | 356/2 |
| 4,335,962 | 6/1982 | Di Matteo | 250/558 |
| 4,654,872 | 3/1987 | Hisano et al. | 250/558 |
| 4,684,990 | 8/1987 | Oxley | 358/92 |
| 4,685,070 | 8/1987 | Flinchbaugh | 364/518 |
| 4,719,585 | 1/1988 | Cline et al. | 364/522 |

Primary Examiner—Leo H. Boudreau
Assistant Examiner—Jose L. Couso
Attorney, Agent, or Firm—Antonelli, Terry, Stout & Kraus

[57] ABSTRACT

A three-dimensional shape of an object is recognized by developing enveloping surfaces of the object by a cone-silhouetting method, wherein the object is picked up by a binocular three-dimensional vision method by making use of geometrical restraint conditions derived by the cone-silhouetting method. The binocular parallax is increased to thereby ensure the recognition of the three-dimensional shape with improved accuracy. Local concave portions which can not be recognized by the cone-silhouetting method by itself are recognized with higher accuracy.

8 Claims, 10 Drawing Sheets

IMAGE #1
BACKGROUND IMAGE / OBJECT IMAGE

FIG. 4A

IMAGE #2

FIG. 4B

IMAGE #3

FIG. 4C

IMAGE #4

FIG. 4D

IMAGE #5

FIG. 4E

IMAGE #6

FIG. 4F

IMAGE #7

FIG. 4G

IMAGE #8

WHOLE CORRESPONDENCE SEARCH MAP

□ : NODAL POINTS

⊚ : PATHS INSIDE OF COMMON PRESUMED EXISTENCE REGION

○ : PATHS FOR BOTH OF LEFT AND RIGHT OBJECT IMAGES (PENALTY PATHS)

● : INTERSECTIONS FOR IMAGES AT LEAST ONE OF WHICH IS BACKGROUND IMAGE

→ ↓ : PATHS HAVING NO CORRESPONDENCE POINTS

FIG. 15

FIG. 16 ered, 4,982,438

APPARATUS AND METHOD FOR RECOGNIZING THREE-DIMENSIONAL SHAPE OF OBJECT

This application is a continuation of application Ser. No. 056,655, filed June 2, 1987, now abandoned.

BACKGROUND OF THE INVENTION

The present invention relates to an apparatus and a method for recognizing a three-dimensional shape of an object by means of camera systems. More particularly, the present invention is concerned with a system for recognizing the three-dimensional shape of an object, which system is advantageously suited to application for inputting graphics data to a computer graphics system.

According to a hitherto known method of recognizing a three-dimensional shape (3D shape) of an object, images of the object of concern are picked up by television cameras from a plurality of different points of vision (sight), wherein the three-dimensional shape of the object is reconstructed in a three-dimensional coordinate system within a computer in the form of a voxel model by adopting a so-called cone-silhouetting method. Reference may be made, for example, to "Computer Vision Study Report 37-2 (1985)" of The Information Processing Society of Japan. However, the shape obtained by this known method consists only of a set of enveloping surfaces of the object, and no consideration is paid to such shape which has local concaves.

On the other hand, a method capable of recognizing and inputting the local concave portions to a computer is known as a binocular three-dimensional vision method, as is disclosed in "Collection of Lectures in 24-th SICE Assembly", p.p. 847 to 848 (1985).

The prior art method relying on the cone-silhouetting method according to which the three-dimensional shape is reconstructed from information of contour lines of images of an object is disadvantageous in that when local concave portions which do not make appearance in the form of contour lines are present in the object can not be recognized, the shape data inputted to the computer is correspondingly degraded in respect to the accuracy.

On the other hand, in the case of the shape recognition method based on the binocular three-dimensional vision method suffers a problem that when the binocular parallax (distance between points of vision) is enlarged with a view to assure an adequate accuracy, difficulty is then encountered in determining or establishing correspondence relations between left and right images, making thus the solution inaccurate by contraries.

SUMMARY OF THE INVENTION

An object of the present invention is to overcome the difficulties of the prior art systems mentioned above and provide a method and apparatus capable of recognizing the three-dimensional shape of an object inclusive of the shape of local concave portions while improving the accuracy of the shape recognition as a whole.

In view of the above object, there is provided according to an aspect of the present invention an apparatus for recognizing the three-dimensional shape of an object, which apparatus comprises a camera system for picking up images of the object from a plurality of points of vision, first arithmetic means for arithmetically deriving restraint conditions imposed on position and/or shape of the object from the outputs of the camera system, and second arithmetic means for arithmetically determining whether the position of an intersection between lines of vision extending from two points of vision of the camera system satisfies the abovementioned geometrical restraint conditions, to thereby determine arithmetically three-dimensional coordinates of a corresponding point on the object on the basis of the above mentioned geometrical restraint conditions as well as the position of intersection which satisfies the abovementioned geometrical restraint conditions.

In a preferred embodiment of the present invention, the binocular three-dimensional vision method capable of recognizing local concave portion is combined with the cone-silhouetting method employed heretofore as the basic means for the shape recognition.

Since the enveloping surfaces constituting the shape of an object are recognized with the aid of the cone-silhouetting method while the binocular three-dimensional vision method is carried out by making use of the geometrical restraint conditions derived from the cone-silhouetting method according to the teaching of the present invention, the binocular parallax can be selected sufficiently large to assure the precise three-dimensional shape recognition with satisfactory accuracy. The local concave portion incapable of being recognized by the cone-silhouetting method by itself can now be recognized. Besides, the accuracy of three-dimensional shape recognition is much improved when compared with the shape recognition performed by the binocular three-dimensional vision method alone.

The above and other objects, novel features and advantages of the present invention will be more apparent by reading the following description of the preferred embodiments taken in conjunction with the accompanying drawings.

DESCRIPTION OF THE PREFERRED EMBODIMENTS

In the following, the present invention will be described in detail in conjunction with exemplary embodiments by reference to the accompanying drawings.

Figure 1:
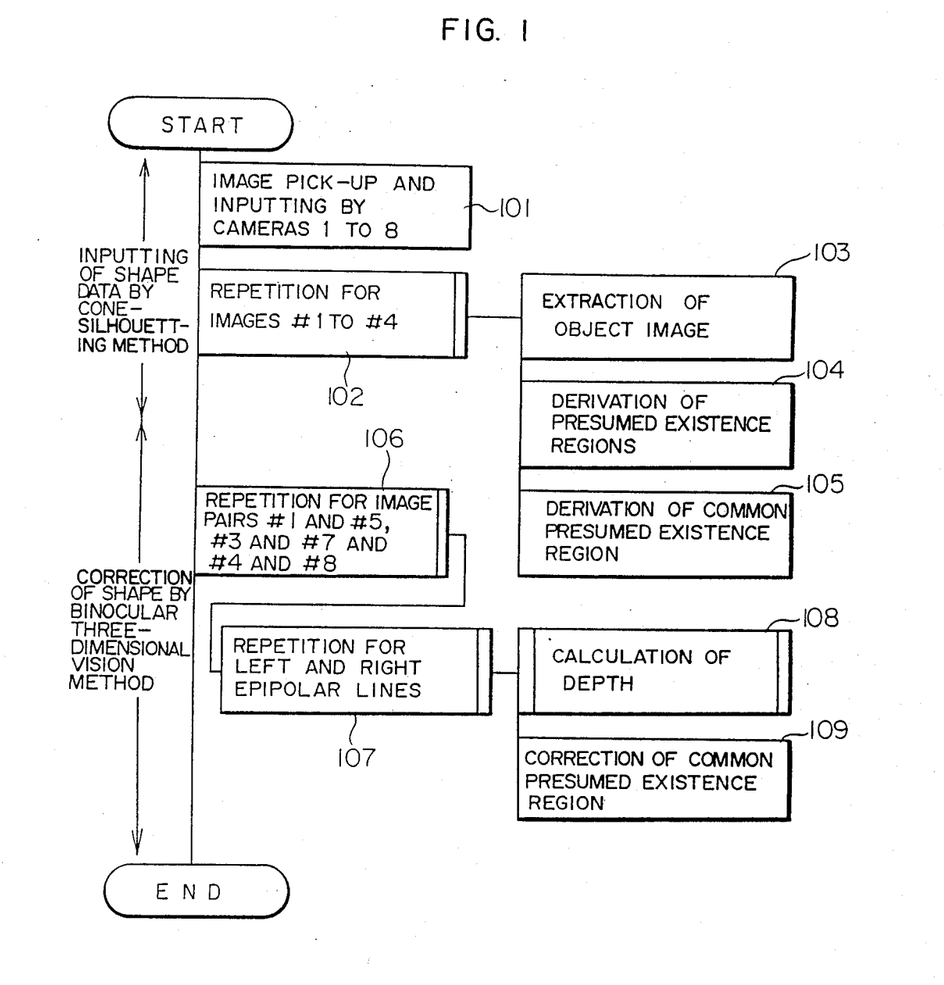
FIG. 1 is a view showing a flow chart for illustrating a three-dimensional image reconstructing procedure according to an exemplary embodiment of the present invention.
Figure 2:
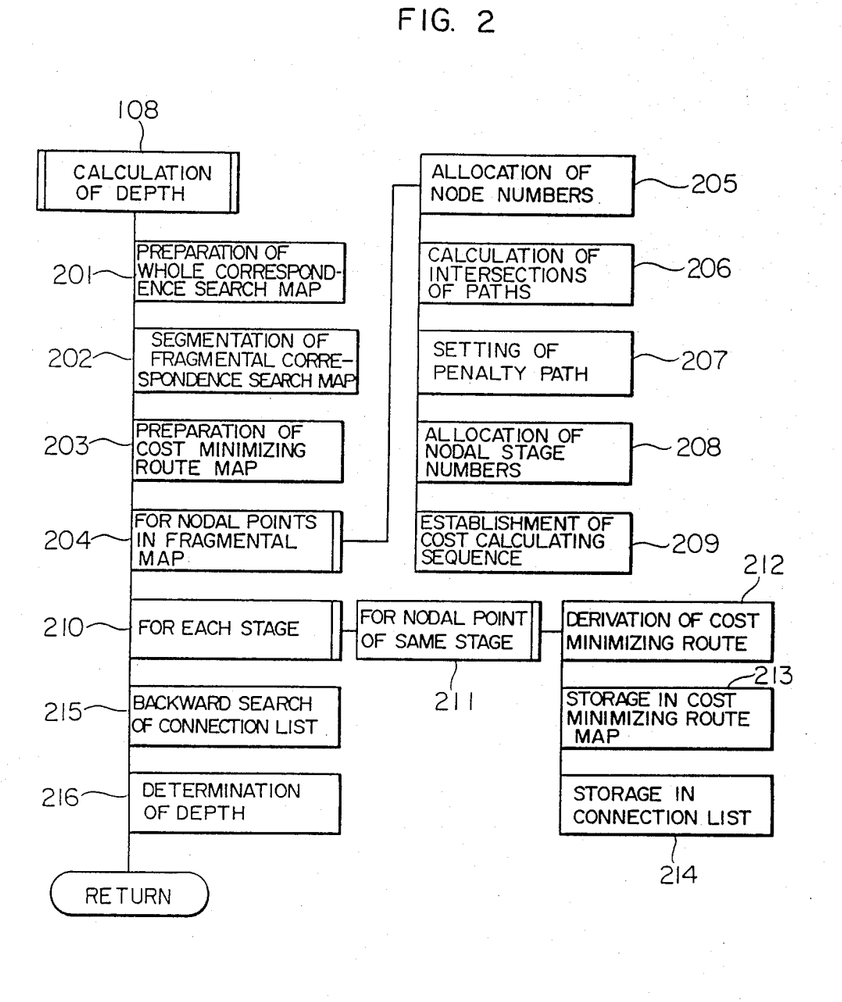
FIG. 2 is a view showing a flow chart for illustrating in detail a part of the flow shown in FIG. 1.
Figure 3:
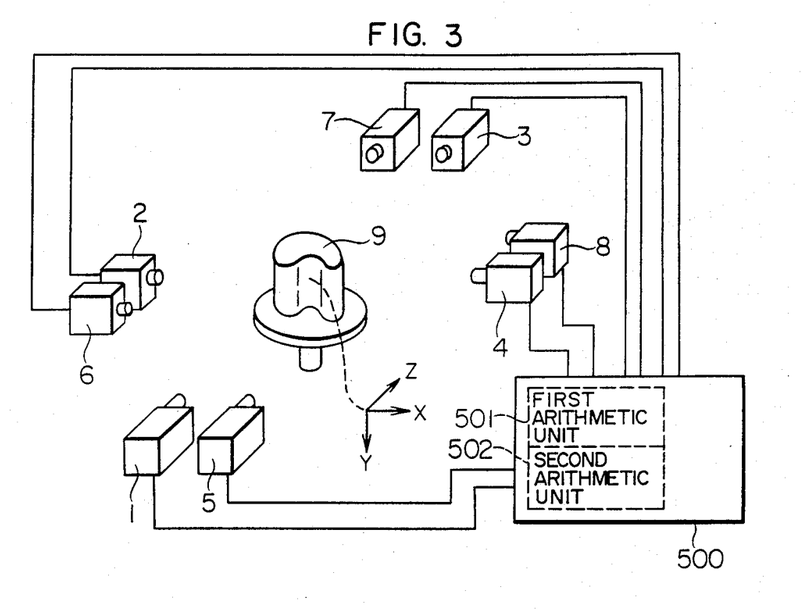
FIG. 3 is a view showing positional relationships between an input object (whose three-dimensional image is to be picked up) and image pick-up cameras.
Figures 4A, 4B:
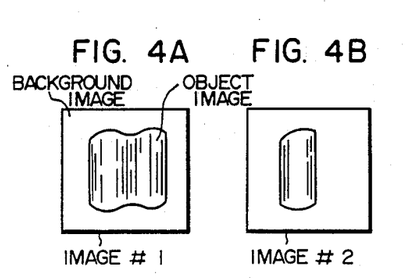
FIGS. 4A to 4H are views showing images available from the outputs of the cameras shown in FIG. 3, respectively.
Figure 4C:
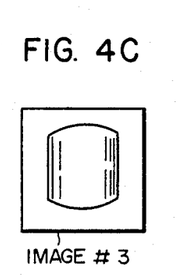
Figure 4D:
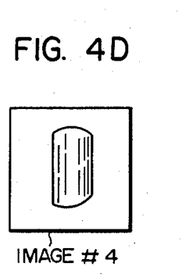
Figure 4E:
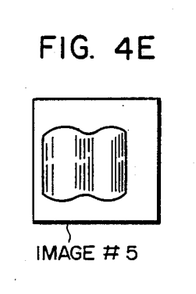
Figure 4F:
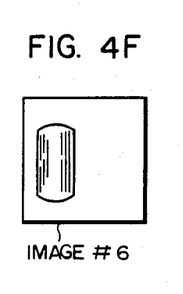
Figure 4G:
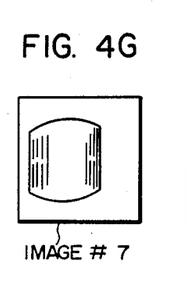
Figure 4H:
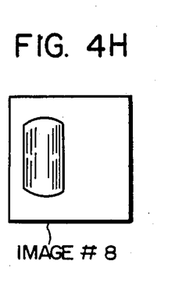

FIG. 1 is a view showing a flow chart for illustrating schematically processing procedures for realizing the teaching of the present invention according to an exemplary embodiment thereof with the aid of computer software, and FIG. 2 is a flow chart illustrating a part of the processing procedure showing in FIG. 1 in more detail. FIG. 3 is a view for illustrating positional relationships between an input object or body 9 whose three-dimensional image is to be picked up and cameras 1 to 8. It should however be mentioned that the invention can of course be implemented by using electric circuits designed for the intended application instead of resorting to the computer software.

In the first place, the processing at the individual steps of the procedure will be elucidated by referring to the flow chart shown in FIG. 1. In this figure, steps 101 to 105 are destined for shape recognition by a cone-silhouetting method which is carried out by a first arithmetic unit 501 shown in FIG. 3, while steps 106 to 109 are destined for correcting the shape recognition on the basis of information available with a binocular three-dimensional vision method executed by a second arithmetic unit 502 (FIG. 3).

At the step 101, images of an object 9 are picked up with a camera system composed of television (TV) cameras 1 to 8, the outputs of which are inputted to a computer 500. The positional relationships among the points of view (sight) are such as illustrated in FIG. 3, wherein the cameras 1 to 4 are disposed in four directions, respectively, which extend substantially perpendicularly to one another at the center corresponding to the position of the input object 9. In this connection, it is assumed that the cameras 1 and 3 are disposed in ±Z - directions, respectively, in a XYZ -orthogonal coordinate system which is positioned spatially fixedly, and that the cameras 2 and 4 are disposed in ±X - directions, respectively. Further, it is assumed that the camera 5 is disposed at a position displaced horizontally from the camera 1 for a predetermined distance to the right toward the origin of the coordinate system. Similarly, the other cameras 6 to 8 are disposed at positions displaced horizontally relative to the cameras 2 to 4, respectively. Two-dimensional image data resulting from the image picking-up of the object 9 through the cameras 1 to 4 and inputted to a memory area (not shown) of the computer 500 are illustrated in FIGS. 4A to 4H, respectively. The image data derived from the camera 1 corresponds to the image or picture #1 shown at FIG. 4A. Same applies to the relations between the cameras 2 to 8 and the images #2 to #8 shown in FIGS. 4B to 4H, respectively. In each two-dimensional image, the region at which the object or body 9 is projected is referred to as the object image while the remaining region is referred to as the background image.

The so-called cone-silhouetting method is a procedure according to which a set of enveloping surfaces of the object is determined from the contour information or data of the object images to thereby establish and approximate the three-dimensional shape of the object. As is indicated at the next step 102, the processing including the succeeding steps 103 to 105 is repeatedly executed for the two-dimensional images #1 to #4 shown in FIGS. 4A to 4D. In the shape approximation based on the cone-silhouetting method, the images #5 to #8 outputted from the cameras 5 to 8 are excluded from use.

At the step 103, each of the two-dimensional images undergoes threshold processing to be binary-encoded (e.g. in white and black levels) to thereby extract the object images.

Figure 5:
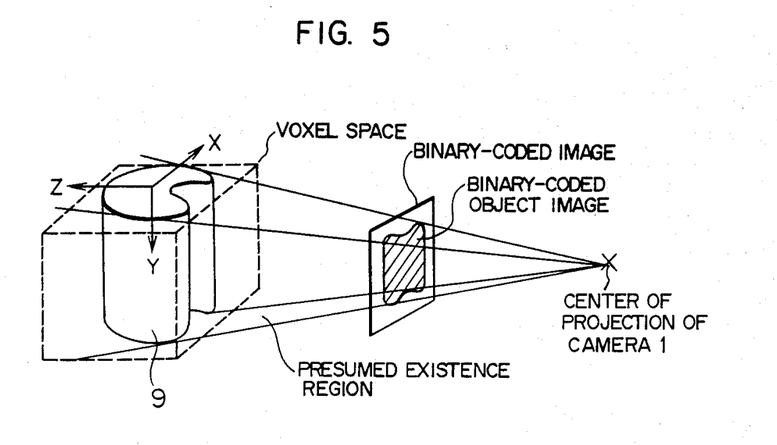
FIG. 5 is a view for illustrating a presumed existence region.
Figure 6:
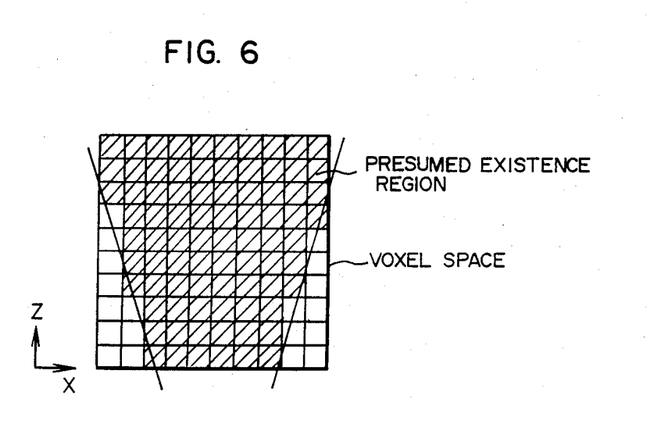
FIG. 6 is a view for illustrating the presumed existence region in a voxel space.

At the step 104, a presumed existence region is arithmetically determined which constitutes a part of geometrical restraint conditions for the position and/or shape of the object. With the phrase "presumed existence region", it is intended to mean a conical region having a vertex at the center of projection of the camera 1 and a sectional shape corresponding to the body image, as will be seen in FIG. 5. With such definition, the input object is necessarily located inside of this cone-like region. For arithmetically determining this region, the conical shape is described in terms of a voxel model which is a model for describing a three-dimensional shape with presence and/or absence of three-dimensional graphic equi-distant lattice points. The space in which voxels can be defined is referred to as the voxel space. Size and disposition of the voxel space is so selected as to encompass inclusively the body or object to be recognized. It should be understood that voxels represent cubic or volume elements of a same size, and a voxel model represents a three-dimensional shape in terms of a set of the voxels. A method of arithmetically determining or calculating the presumed existence region with the aid of a voxel model is illustrated in FIG. 6. The assumed or presumed existence region shown in FIG. 4 corresponds to the line of vision of the camera 1 and shows a cross-section of the voxel space shown in FIG. 5 taken along an X-Z plane. For simplification sake of illustration, it is assumed that the voxel space consists of 10×10×10 voxels. The cross-section of the presumed existence region along an X-Y plane is of a similar shape to that of the object image and has a size which is proportional to the distance to the center of projection along the Z-axis. Consequently, an X-Y section of the voxel space can be obtained by scaling the object image derived from the camera as a function of the aforementioned distance. By layering sequentially the object images obtained through the scaling, the presumed existence region indicated by hatching in FIG. 6 can be obtained in the form of a voxel model. Since the presumed existence region spreads outwardly progressively as the distance from the center of projection is increased, as will be seen in FIG. 5, the presumed existence region shown in FIG. 6 spreads laterally as the Z-coordinate value is increased.

Figure 7:
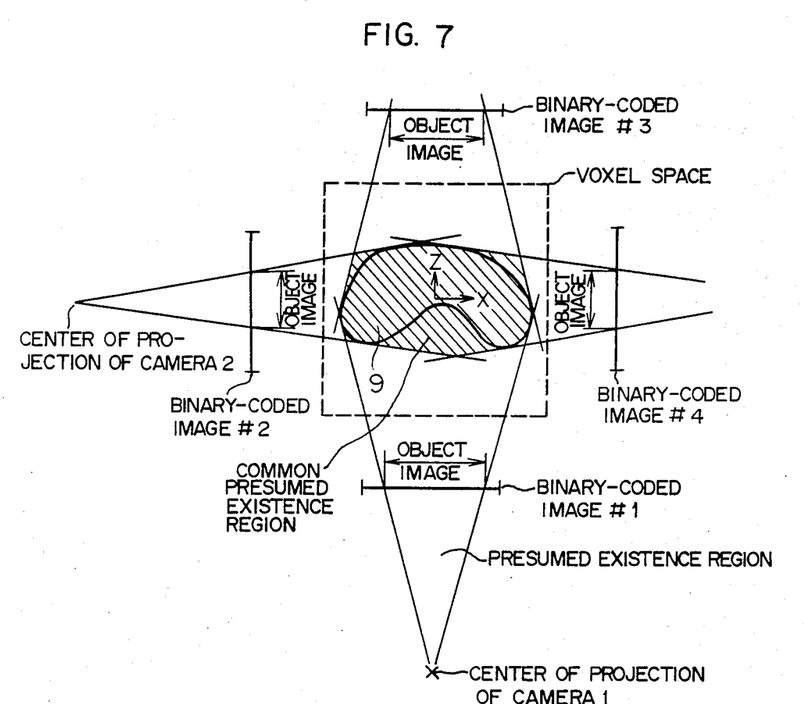
FIG. 7 is a view for illustrating a common presumed existence region.
Figures 8, 9:
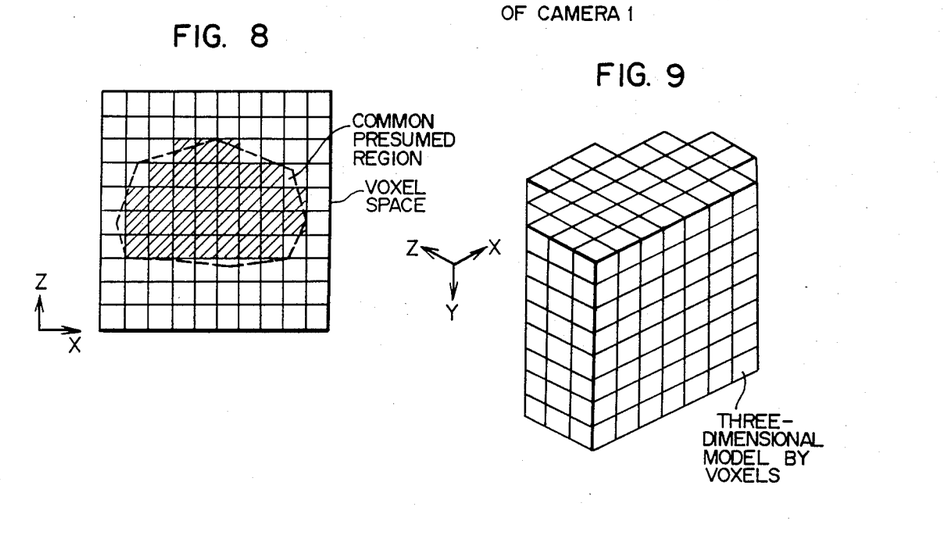
FIG. 8 is a view for illustrating the common presumed existence region in a voxel space.
FIG. 9 is a view showing a three-dimensional model constructed by elementary voxels.

At the step 105, a common presumed existence region is determined. FIG. 7 is a view for illustrating the common presumed existence region. As will be seen in this figure, the common presumed existence region is a logical product of the presumed existence regions corresponding to the individual centers of projection and is represented by a hatched region in FIG. 7. FIG. 8 is a view showing a cross-section (along an X-Z plane) of a common presumed existence region determined within the voxel space. The logical product of the individual presumed existence regions can be determined by logic operations on the voxel basis. More specifically, by extracting only those voxels that are common to one another in all the projecting directions, such a shape as shown in FIG. 8 can be obtained. Once the common presumed existence region has been determined in this way, the input object must be of a shape which bears an inscribed relation to the determined common presumed existence region. In other words, the common presumed existence region is given as a set of enveloping surfaces of the input object and regarded to represent the primary general shape of the input object, which region in turn imposes the geometrical restraint conditions concerning the position and/or shape of the object. FIG. 9 is a view showing three-dimensional-graphically the shape resulting from the shape recognition based on the cone-silhouetting method and displayed on a display unit (not shown).

Figure 10:
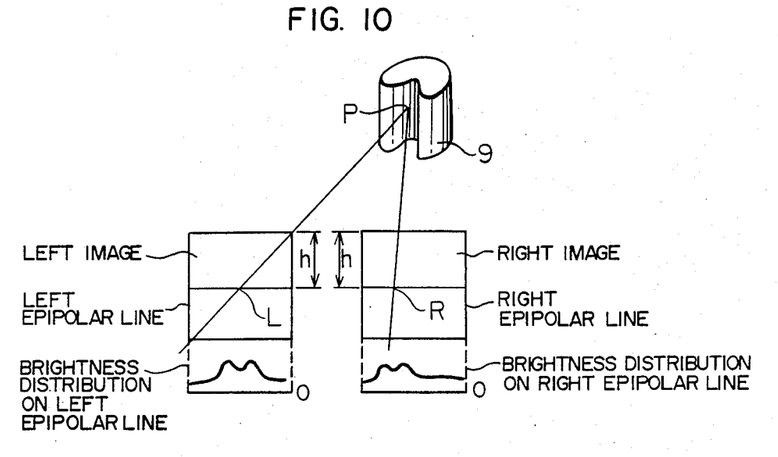
FIG. 10 is a view for illustrating a binocular three-dimensional vision method.

The processing executed at the steps 106 et seq. is for correcting the general shape determined in the manner described above by a binocular three-dimensional vision method, according to which combinations of pairs of two-dimensional images #1 and #5, #2 and #6, #3 and #7 and #4 and #8 picked up by the pairs of cameras 1 and 5, 2 and 6, 3 and 7 and 4 and 8 having different points of sight, respectively, are processed. FIG. 10 is a view showing schematically the shape inputting operation in carrying out the binocular three-dimensional vision method and illustrates a manner in which the depth to the input object is determined from the left and right two-dimensional images. By way of example, it is assumed that the left image corresponds to the image #1 shown in FIG. 4 with the right image corresponding to the image #5 shown in FIG. 4. The fundament of the binocular three-dimensional vision method resides in determination of the depth to the object from the corresponding points of the left and right images by making use of the principle of trigonometrical measurement.

Now, assuming that a pair of cameras are disposed horizontally and oriented in the same direction as in the case of the cameras 1 and 5 shown in FIG. 3, a method of determining the corresponding points in the images derived from these paired cameras will be described. It is again assumed that a point P on the surface of the input object shown in FIG. 10 lies at a position of a point L on the left image also shown in FIG. 10. On the assumption, if a point R on the right image corresponding to the point L can be determined, the distance or magnitude of the depth to the point P on the input object can be calculated through the trigonometrical measurement since line segments $\overline{LP}$ and $\overline{RP}$ are known. In this connection, it will be noted that when the paired cameras are disposed horizontally with a predetermined distance therebetween, as is shown in FIG. 3, the points L, P and R must lie on one and the same plane and thus the point R corresponding to the point L exists necessarily somewhere on a straight line at a same height (h) as the point L on the right image in the light of the given geometrical relation. This straight line is generally referred to as the epipolar line. The utterly same relation is present as to the point on the left image corresponding to the point on the right image. Consequently, the presence of the correspondence relation between the left and right images can be reduced to the presence of matching between the left and right epipolar lines which can be handled as one-dimensional vectors, respectively. According to the illustrative embodiment, the corresponding points are searched by a dynamic programming method by making use of brightness value of pixels on the left and right epipolar lines.

Figure 11:
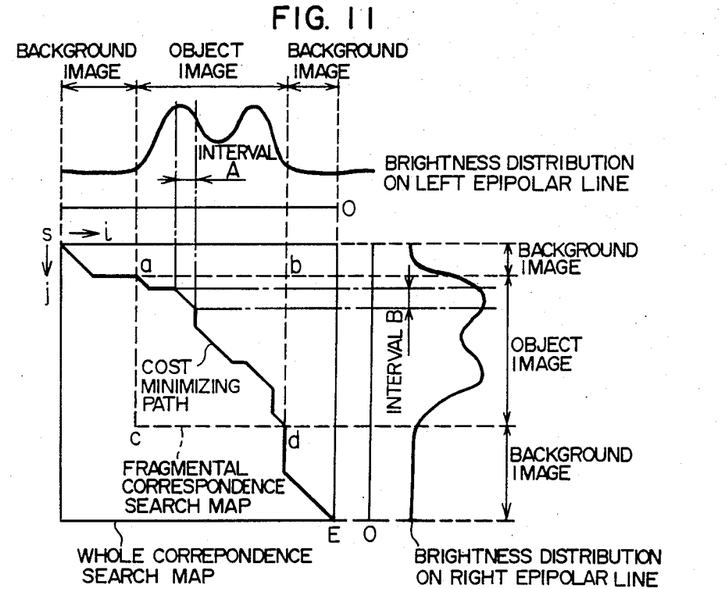
FIG. 11 is a view for illustrating a method of matching a left image with a right image.

FIG. 11 is a view for illustrating a method of matching the left and right epipolar lines by making use of the brightness values of the pixels on the epipolar lines. A curve shown at the top of FIG. 11 and representing brightness distribution on the left epipolar line is identical with that of the left image shown in FIG. 10, while the graph shown at the lower right corner in FIG. 11 is identical with that of the right image shown in FIG. 10. The brightness distribution curve is plotted on the assumption that the portion nearest to the point of sight is most bright. Further, the line is divided into segments belonging to the background image region and the body image region, respectively, through the threshold processing technique described hereinbefore in conjunction with the step 103. The matching between the left and right epipolar lines is effectuated by selecting a minimum cost path interconnecting a start point S and an end point E on a correspondence search map. In the calculation of cost, difference in brightness between the left and right pixels is made use of. The path for which the sum of all the costs is minimum is defined as the minimum cost path or the cost minimizing path. The correspondence search map shows a manner in which the left and right pixel strings are combined, wherein an upper left point S represents the start point while a lower right point E represents the end point. The pixel-based correspondence relation between the left and right pixels is determined by the path interconnecting the start and end points S and E. The path moving slantingly on the map indicates a portion of the map in which the inter-pixel matching has been established, while the path moving vertically or horizontally indicates a portion of the map in which the inter-pixel matching could not be found, as will be described in more detail hereinafter. By way of example, each of the pixels included in an interval A on the left epipolar line is in one-to-one correspondence with each of the pixels included in an interval B on the right line. Once the paired pixels has been matched in this manner, the depth to the input object can be calculated on the basis of the positions of both the pixels in the real space.

At a step 107, it is indicated that the processing succeeding to this step is repeated for every epipolar line for scanning completely the image to thereby obtain three-dimensional information of the input object.

At a step 108, calculation for determining the depth is performed. Details of this step is shown in FIG. 2 at steps 201 et seq..

At a step 201, all the correspondence search maps are prepared. These maps represent correspondence relations for all the pixels on the left and right epipolar lines, as is illustrated in FIG. 11. This processing resides in defining the combinations of the left and right pixels to which the paths in the maps belong. Assuming now that the number of the pixels on the left epipolar line is m and that of the right epipolar line is n, the number of nodal points of all the correspondence searching maps amounts to $(m+1) \times (n+1)$. When the nodal point is represented by $(i, j)$, a slant path interconnecting the points $(i, j)$ and $(i+1, j+1)$ indicates that the $(i+1)$-th pixel on the left epipolar line is matched with the $(i+1)$-th pixel on the right epipolar line.

At a step 202, segmentation of a partial or fragmental correspondence search map from the whole correspondence search map is effected. The partial correspondence search map corresponds to the regions associated with the object image portions of the left and right epipolar lines in the whole correspondence searching map. A region enclosed by a block a-b-d-c in FIG. 11 corresponds to the partial or fragmental correspondence search map. The succeeding depth calculation is limited to only the paths within this region.

Figure 12A:
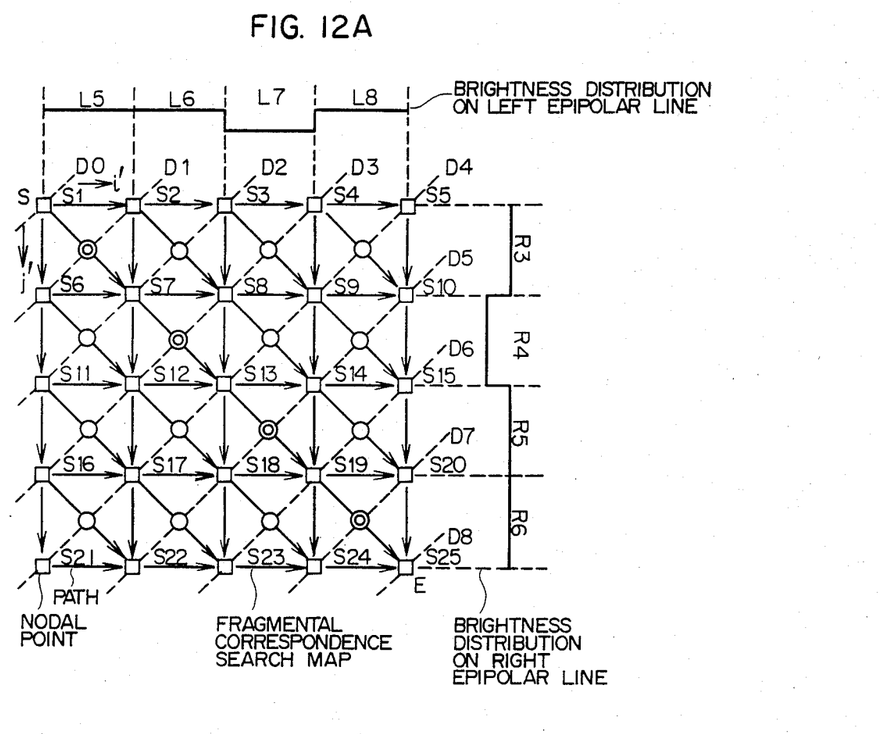
FIGS. 12A, 12B and 12C are views for illustrating a fragmental correspondence search map.
Figure 12B:
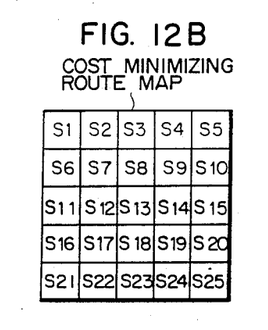
Figure 12C:
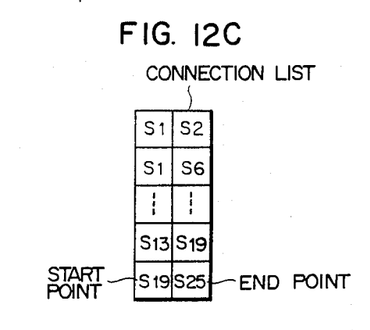

FIGS. 12A, 12B and 12C are views for illustrating manners of the processing at nodal points in the fragmental correspondence search map constituting a part of the whole correspondence search map. Symbols L5 to L8 denote the fifth to eighth pixels on a left epipolar line which has brightness distribution shown in FIG. 12A. Similarly, symbols R3 to R6 denote pixels on a right epipolar line. Further, S1 to S25 are identification numbers of the nodal points, while D0 to D8 designate the nodal stages.

At a step 203, a cost minimizing map is prepared. This map corresponds to the nodal points S1 to S25 in the fragmental correspondence search map and is realized in a two-dimensional array of (m'+1) rows ×(n'+1) columns where m' represents the number of the pixels on the left epipolar line and n' represents the number of the pixels on the right epipolar line. In the case of the example illustrated in FIG. 12B, it is assumed that m'=4 and n'=4. There is stored at each of the array elements the cost minimizing path allowing to reach the associated nodal point as calculated at subsequent steps.

At a step 204, it is indicated that the processing executed at succeeding steps 205 to 209 is performed for all the nodal points within the fragmental correspondence search map.

At the step 205, the nodal point identification numbers are assigned to the individual nodal points. More specifically, the nodal point located at the intersection of the i'-th row and the j'-th column in the segmented correspondence search map is assigned with the identification number of j'×(l+1)+i'+i. In FIG. 12A, S1 to S25 represent the nodal point identification numbers, respectively.

Figure 13:
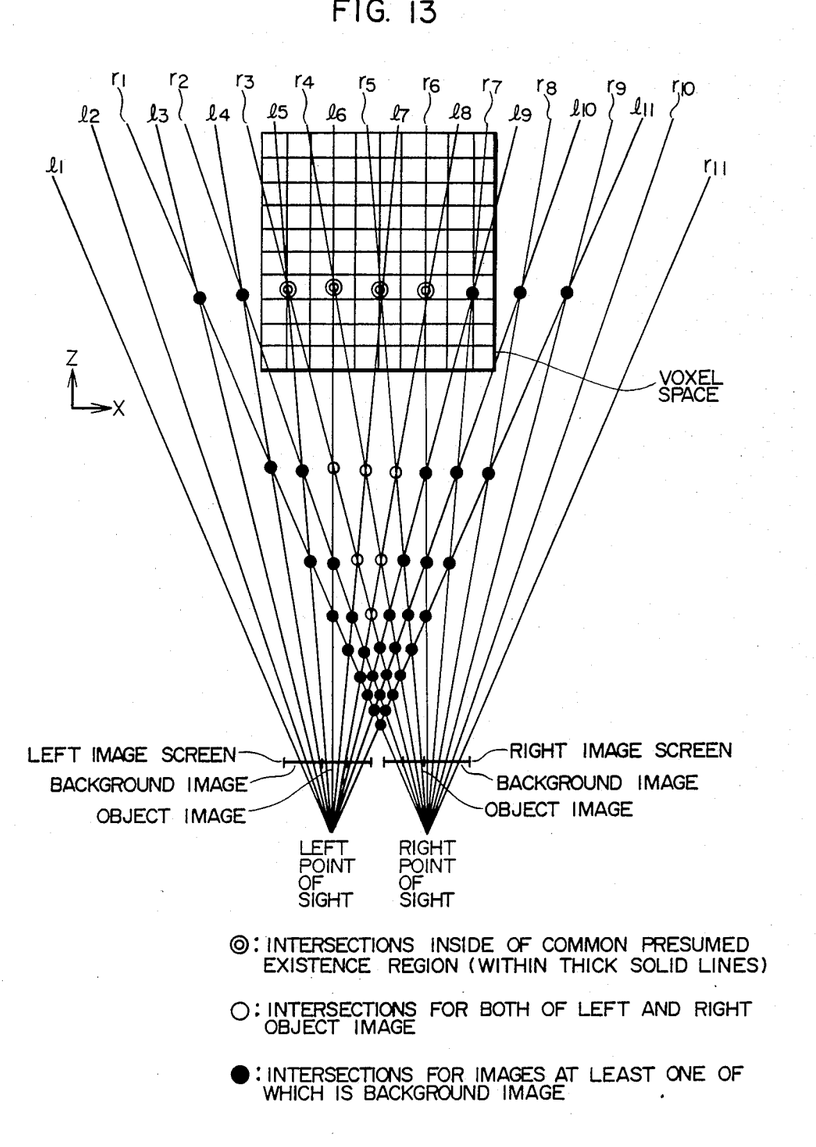
FIG. 13 is a view for illustrating significance of intersecting points of paths.

FIG. 13 is a view showing straight lines interconnecting the pixels on images and the points of vision and intersections among the straight lines. It is now assumed that the number of the pixels on each of the left and right images is eleven. Symbols l1 to l11 represent, respectively, the straight lines interconnecting the pixels on the left image and the left point of vision and referred to as the lines of vision, while r1 to r11 represent, respectively, the straight lines (i.e. lines of vision) interconnecting the pixels on the right image and the right point of vision. Among the lines, those associated with the object image are designated by l5 to l8 and r3 to r6. In this connection, it is noted that the accuracy attainable by the binocular three-dimensional vision method is subjected to the influence of binocular parallax which is a function of the distance between the left and right points of vision. The abovementioned accuracy can be improved as the distance between the left and right points of vision is increased, since then the distance between the front and rear intersections is correspondingly decreased.

At the step 206, the intersection of the path is arithmetically determined. In the case of the example illustrated in FIG. 12A, the path extending from S7 to S13 indicates that the left pixel L6 is matched with the right pixel R4. The actual object position corresponds to the intersection between the lines l6 and r4 shown in FIG. 13. In other words, the outer shape of the object to be recognized can be determined in terms of a set of these intersections. At this step, the arithmetic determination of positions of the other intersections than those designated by solid circles in black in FIG. 13 is performed. At least one of the intersections on both the left and right images indicated by the solid circles in black belongs to the background image and is irrelevent to the position of the input object. Since the positions of the points of view and the positions of the pixels are known, the position of any intersection can be numerically determined as the intersection between two straight lines.

At a step 207, a penalty path is established. Referring to FIG. 13, the set of intersections includes those represented by double-circles and single-circle in addition to those represented by the black solid circles. The intersection indicated by the single-circle indicates that the associated left and right pixels both belong to the object image. The intersections represented by the double-circles are located internally of the common presumed existence region which presents the geometrical restraint condition, as described hereinbefore. The common presumed existence region can be determined in terms of a set of the elements within the voxel space as shown in FIG. 8. Accordingly, decision can be made as to whether the intersections determined on the basis of this information is located inside or outside of the voxel space. Since the input object is necessarily located within the voxel space, penalty is given to the path which includes the intersection decided to lie outside of the voxel space. In FIG. 12A, the paths attached with the single-circles are the penalty paths. At this step, it is decided whether the paths starting from a given nodal point include the penalty path or not. If the penalty path is included, a penalty value is entered in the cost minimizing path map at a location corresponding to that nodal point.

The penalty value is a constant of a sufficiently large value. By way of example, when the brightness level of the pixel is of a value "256", a constant of a value not smaller than "256" may be used as the penalty value.

In the case of the example shown in FIG. 12A, the nodal points which are not imposed with penalty are only those designated by S1, S7, S13, S19 and S25, which are sufficient for determining definitely the minimum cost path. However, in actual application, the number of pixels is much greater. Accordingly, a plurality of candidates for the minimum cost path (or cost minimizing path) exist in the vicinity of the diagonal line.

At a step 208, allocation of the stage numbers to the nodal points is performed. This is a processing required for finding the matching between the left and right lines by the dynamic programming method. In the case of the example illustrated in FIG. 12A, the nodal point belonging to the stage D3 is the node S1 while the nodes S2 and S6 belong to the stage D1. In other words, a string of nodal points arrayed slantingly on the segmented correspondence search map are considered to belong to a common stage.

Now, description will be made on a method of determining the minimum cost path by the dynamic programming method. When the start point is represented by S while the minimum cost path allowing to reach the nodal point located at a position (i', j') of the k-th stage is represented by $G_k(i', j')$, the recursion formula for reaching the end point E by way of the minimum cost path is given by $$G_o(0, 0) = 0$$

$$G_{k+1}(i', j) = \min \begin{vmatrix} G_k(i'-1, j) + d_1 \\ G_{k-1}(i'-1, j-1) + d_2(i', j) \\ G_k(i', j-1) + d_1 \end{vmatrix}$$

where m' represents the number of pixels of the object image on the left epipolar line, and n' represents the number of pixels of the object image on the right epipolar line. The coordinate of the start point S is given by (0, 0), and that of the end point E is given by (m', n'). Further, $d_1$ represents the cost involved by the path moving horizontally or vertically and is given by a constant value determined by averaging the difference in brightness among all the left and right pixels. Finally, $d_2$ is given by the following expression:

$$d_2(i', j) = |I_l(i') - I_r(j)|$$

where $I_l(i')$ represents the brightness of the i'-th pixel on the left line and $I_r(j')$ represents the brightness of the j'-th pixel on the right line. The calculation according to the aforementioned recursion formula is repeated from S to E to determine the minimum cost path.

At a step 209, the sequence of cost calculation for the nodal points is established. It is required to conduct the calculation starting from the smallest stage number. In the case of the example illustrated in FIG. 12, the calculation is conducted in the sequential order of D0, D1, D2, D3, D4, D5, D6, D7 and D8 in this order.

At a step 210, it is indicated that succeeding processing is repeated for every stages of D0 to D8.

At a step 211, it is indicated that the succeeding processing is repeated for all the nodal points belonging to the same stage starting from the nodal point of the smallest node number. By way of example, in the stage D4, the cost calculation is conducted in the sequential order of S5, S9, S13, S17 and S21.

At a step 212, calculation is conducted in accordance with the recursion formula mentioned hereinbefore for determining the cost minimizing path. By way of example, assuming that the nodal point S13 is the end point to be reached, there are available three paths from S8 to S13, S7 to S13 and S12 to S13, respectively. At this step 212, the path which can minimize the cost in reaching the nodal point S13 is found out of the three paths mentioned above. Since S7=(1, 1), S8=(2, 1), S12=(1, 2) and S13=(2, 2), $$G_{D4}(2, 2) = \min \begin{vmatrix} G_{D3}(2, 1) + d_1 \\ G_{D2}(1, 1) + d_2(2, 2) \\ G_{D3}(1, 3) + d_1 \end{vmatrix}.$$

Out of these three paths, the cost minimizing path is selected.

At a step 213, the cost minimizing path determined at the step 212 is stored in a map. More specifically, the cost value of the cost minimizing path $G_{D4}(2, 2)$ is stored in the map at the location S13 shown in FIG. 12B.

At a step 214, the nodal point numbers of the start and end points of the cost minimizing paths reaching to the individual nodal points are stored in an interconnection list having a structure shown in FIG. 12C.

At a step 215, processing for retrieving the prepared connection list in the reverse or backward direction is performed starting from the end point. By way of example, it is determined through the reverse retrieval of the connection list that the start point for the end point S25 is S19 and the start point for S19 is S13. This procedure is repeated until the start point S1 has been attained. In other words, it is possible with the information contained in the connection list to decide which nodal point is to be selected as the start point for reaching a given nodal point with the minimum cost. Thus, the path determined through the reverse retrieval is the cost minimizing path which interconnects the start point and the end point.

At a step 216, the depth to the object is again calculated by using the determined information concerning the matching between the left and right pixels. This step is similar to the step 206, and the intersection between two straight lines is arithmetically determined. The calculation for determining the intersection is performed only for the paths which constitute the cost minimizing paths.

Figure 14:
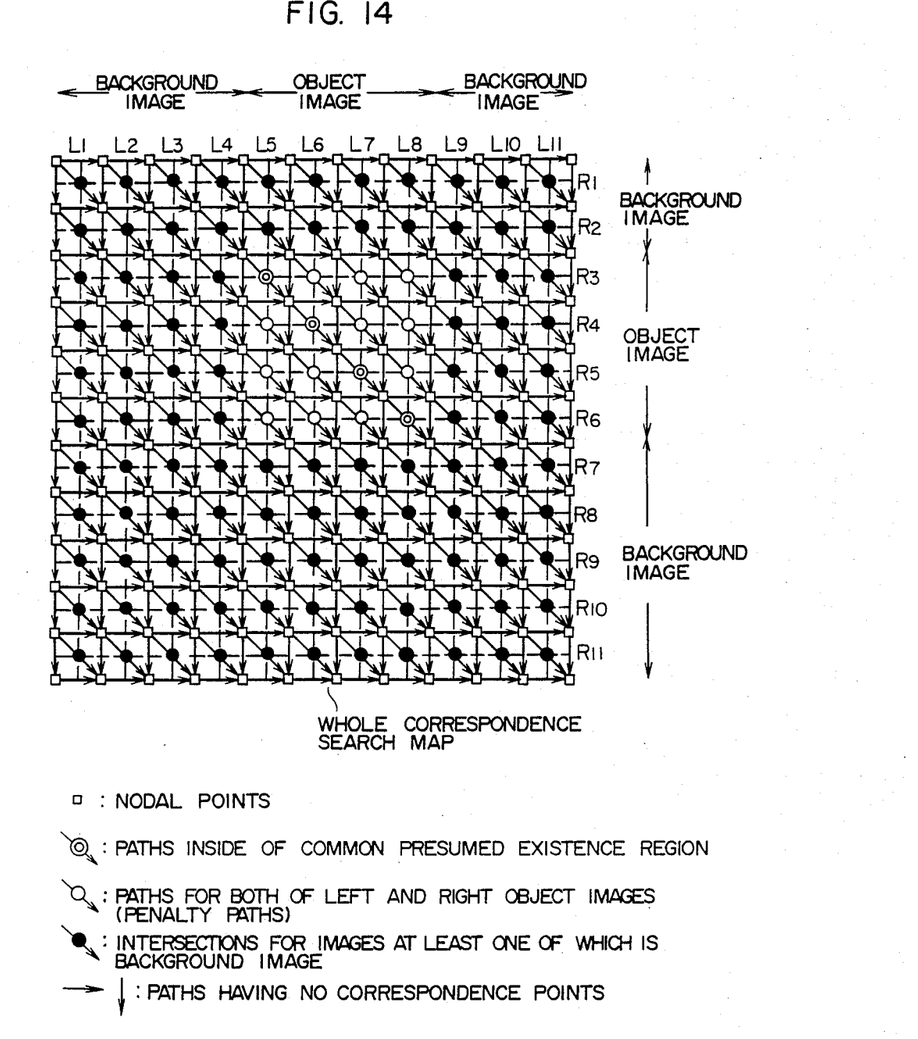
FIG. 14 is a view for illustrating a whole correspondence search map.

The processing for determining the cost minimizing path from the whole correspondence search map will be again elucidated by reference to FIG. 14. As is shown in FIG. 13, on the left epipolar line, the pixels L5 to L8 are of the object image, while the pixels R3 to R6 on the right epipolar line belong to the object image. The black solid circle attached to the paths in FIG. 14 indicates that at least one of the paired paths is of the background. These paths represent information of the depth to the background portion exclusive of the object to be recognized. Accordingly, these paths are excluded from the calculation for determining the matching between the left and right epipolar lines. Subsequently, for the remaining paths, the cost involved in the matching is calculated. Further, for the combinations of the intersections included in each path, the positions of the intersections are sequentially determined by calculation. It is then determined which of those intersections are located inside of the common presumed existence region and which intersections are outside of that region. In FIG. 14, the intersections located within the common presumed existence region are designated by the double-circle marks with those intersections located outside of that region being marked by the single-circle marks. The paths belonging to the object image are nevertheless regarded to be the penalty paths provided that the intersections thereof are located outside of the common presumed existence region. The cost minimizing path determined by the dynamic programming method is selected from the paths attached with the double circle marks. In this manner, in the case of the illustrative embodiment, the range in which the cost minimizing path is selected is narrowly limited by the geometrical restraint conditions imposed at two stages. In contrast, according to the prior art technique, the selection is not imposed with the restraint conditions, and the parallax is selected large for the purpose of enhancing the accuracy, which however means that the matching could be erroneously established. When the parallax is large, the true cost minimizing path extends through a region which is distanced significantly from the diagonals of the whole correspondence searching map. This means that the number of the pixels for which the matching can not be established will be increased, as the result of which erroneous matching is validated in dependence of the set value of the cost, providing a cause for decreasing the accuracy.

Figure 15:
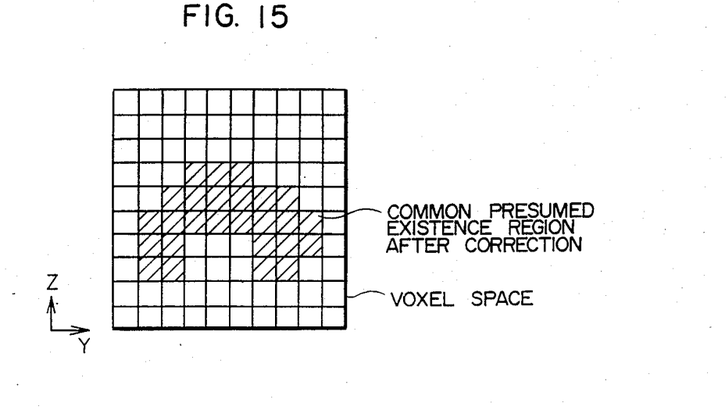
FIG. 15 is a view for illustrating the common presumed existence region in the state after having been corrected in the voxel space.
Figure 16:
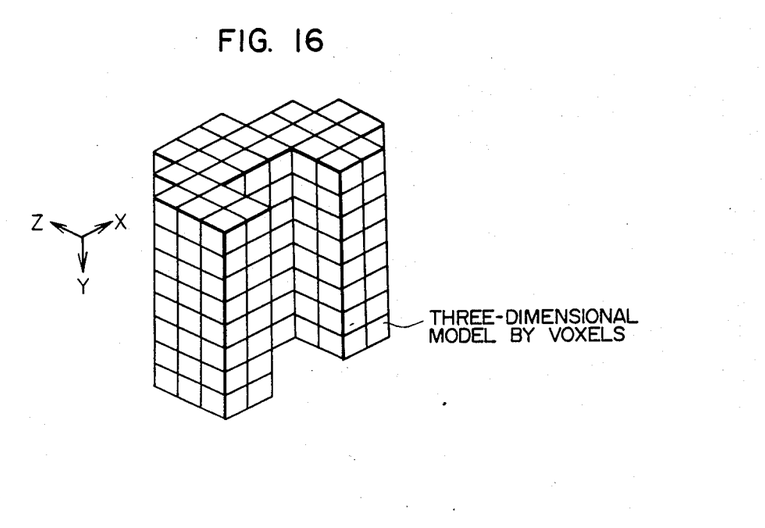
FIG. 16 is a view for illustrating a three-dimensional model obtained finally and constituted by elementary voxels.

Now, turning back to the flow chart shown in FIG. 1, at the next step 109, the common presumed existence region is corrected by utilizing the information obtained from the binocular three-dimensional vision method. The cross-section of the shape obtained by the cone-silhouetting method is such as illustrated in FIG. 8. On the other hand, FIG. 15 shows the cross-section of the shape obtained after the correction. FIG. 16 shows the three-dimensional voxel-mosaicked model displayed on a display unit (not shown).

The shape shown in FIG. 16 is the final shape which can be obtained. Information of this final shape is inputted to a computer to be managed or processed.

According to the illustrative embodiment of the present invention, the general shape of an object is recognized with the aid of the cone-silhouetting technique. According to this method, the contour line information which exhibits the greatest insusceptibility to the influence of noise in the image information is available. Thus, the stabilized shape can be obtained. However, the shape as obtained consists of a set of enveloping surfaces of the object in concern, inhibiting thus a local recess from being inputted. To solve this problem, the shape recognition is conducted by adopting the binocular three-dimensional vision method in the case of the illustrative embodiment of the invention, whereby correction is performed for those portions which could not be recognized through the preceding cone-silhouetting procedure. In conjunction with this three-dimensional vision recognition method, the common presumed existence region available within the voxel space is made use of as the geometrical restraint conditions for the matching between the left and light images. Through this restraint condition, the range through which the cost minimizing path extends can be limited to a narrow range, whereby the accuracy for the shape recognition can be more increased.

Since the final shape is obtained by performing binocular three-dimensional vision correction on the set of enveloping surfaces of the object obtained by the cone-silhouetting method, the local concave or recess which could not be recognized by the prior art method can now be recognized, whereby the accuracy for shape recognition is improved as a whole, and thus the recognition data can be utilized more effectively in a computer graphic system for displaying, processing and/or managing the shape.

The hitherto known binocular three-dimensional vision method suffers a drawback in that when parallax is enlarged in an effort to realize the satisfactory accuracy, difficulty is encountered in determining correspondence between the left and right images. In contrast, according to the present invention, the range in which the correspondence search is performed can be limited by utilizing the geometrical restraint condition derived from the information of the set of enveloping surfaces, whereby the erroneous determination of correspondence can be excluded. Thus, when compared with the application where the binocular three-dimensional vision method is employed independently by itself, the accuracy can be significantly improved according to the teaching of the present invention.

In brief, the invention makes it possible to recognize even the local concave portion and enhance the accuracy for the recognition of the shape as a whole.

We claim:

1. An apparatus for recognizing a three-dimensional shape of an object, comprising:

a camera system for picking up images of said object from a plurality of points of vision;

first arithmetic means for arithmetically deriving geometrical restraint conditions imposed on position and/or shape of said object from the outputs of said camera system, said geometrical restraint conditions being a set of enveloping surfaces that contact at least one point of said object and envelop said images of said object; and second arithmetic means for arithmetically determining whether a position of intersection between viewing lines extending from two points of vision of said camera system satisfies said derived geometrical restraint conditions, to thereby determine arithmetically three-dimensional coordinates of a corresponding point on said object based on a position of intersection which satisfies said geometrical restraint conditions as well as said geometrical restraint conditions.

2. An apparatus for recognizing a three-dimensional shape of an object according to claim 1, wherein said first arithmetic means determines a closed region formed of a set of planes circumscribing said object in terms of a set of enveloping surfaces of said object, to thereby allow the property that said object exists inside of said set of enveloping surfaces which are to be the content of said geometrical restraint conditions.

3. An apparatus for recognizing a three-dimensional shape of an object according to claim 2, wherein a presumed existence region of a cone-like shape has a bottom shape corresponding to that of in object image on a picked-up picture and a vertex at a point of vision in each direction of vision, and a logical product portion common to said region in all the directions of vision is determined as a common presumed existence region, the shape of said common presumed existence region being handled as the set of enveloping surfaces.

4. An apparatus for recognizing a three-dimensional shape of an object according to claim 3, wherein the shape of said presumed existence region is described in terms of a voxel model which represents presence or absence of spatial lattice points, said common presumed existence region being determined by performing a logical product determining operation for each elementary voxel, to thereby allow the set of enveloping surfaces of the object to be described in terms of said voxel model.

5. An apparatus for recognizing a three-dimensional shape of an object according to claim 1, wherein said second arithmetic means performs a determination of correspondence of pixels and said correspondence points on the basis of an assumption that respective correspondence points correspond to pixels of a picked-up image, and wherein an evaluation function for selecting an optimum correspondence from candidates which satisfy said geometrical restraint conditions is established as a sum of differences in brightness of pairs of pixels, each pair having correspondence relation therebetween, a corresponding point on the object being determined by selecting such correspondence which minimizes said evaluation function.

6. An apparatus for recognizing a three-dimensional shape of an object according to claim 1, further including display means for displaying the results of an arithmetic operation performed by said first arithmetic means and/or the results of an arithmetic operation performed by said second arithmetic means.

MISSING PAGE TEMPORARY NOTICE

PATENT # 4982438   FOR ISSUE DATE 1-1-1991

HAS BEEN SCANNED, BUT WITH MISSING PAGE(S). UPON RECEIVING OF MISSING PAGE(S), THE ENTIRE DOCUMENT WILL RE RESCANNED. PLEASE CALL IMAGE DATA ADMINISTRATION STAFF OF 557-6154 IF YOU HAVE A QUESTION. ASK FOR DAVE GROOMS, ANITA YOUNG OR POLA JONES.

THIS NOTICE IS FOR THE MISSING PAGE CONTAINING:

COLUMN # 13 TO END